US012638631B2

(12) United States Patent
Zaviyalov et al.

(10) Patent No.: US 12,638,631 B2
(45) Date of Patent: May 26, 2026

(54) LIGHTING DEVICE AND METHOD FOR PRODUCING A LIGHTING DEVICE

(71) Applicant: Lisa Dräxlmaier GmbH, Vilsbiburg (DE)

(72) Inventors: Alexandr Zaviyalov, Vaterstetten (DE); Josef Kiermaier, Unterdietfurt (DE); Michael Windl, Landshut (DE); Dietmar Graf, Taufkirchen (DE); Manfred Winklbauer, Landshut (DE); Bernhard Bayersdorfer, Baierbach (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 18/686,415

(22) PCT Filed: Feb. 28, 2022

(86) PCT No.: PCT/EP2022/073270
§ 371 (c)(1),
(2) Date: Feb. 24, 2024

(87) PCT Pub. No.: WO2023/025700
PCT Pub. Date: Mar. 2, 2023

(65) Prior Publication Data
US 2024/0385362 A1      Nov. 21, 2024

(30) Foreign Application Priority Data
Aug. 24, 2021    (DE) ..................... 10 2021 121 853.5

(51) Int. Cl.
*F21V 8/00*        (2006.01)
*B60K 35/10*       (2024.01)
(Continued)

(52) U.S. Cl.
CPC ............ *G02B 6/0036* (2013.01); *B60K 35/10* (2024.01); *B60K 35/20* (2024.01); *B60Q 3/64* (2017.02);
(Continued)

(58) Field of Classification Search
CPC ................... F25D 27/00; F25D 17/062; F25D 2317/0665; F25D 2327/00
(Continued)

(56) References Cited

U.S. PATENT DOCUMENTS

2014/0140091 A1      5/2014  Vasylyev
2019/0278411 A1*     9/2019  Jeon ........................ G09F 9/301
(Continued)

FOREIGN PATENT DOCUMENTS

DE          103 30 050.3 A1      2/2005
DE     10 2013 008 433.4 A1     11/2014
(Continued)

OTHER PUBLICATIONS

German Search Report, Appln. No. DE 10 2021 121 853.5, Mar. 21, 2022.
(Continued)

*Primary Examiner* — James R Greece
*Assistant Examiner* — Hana S Featherly
(74) *Attorney, Agent, or Firm* — BelayIP

(57) ABSTRACT

The invention relates to a lighting device (10) with a flat light guide (12) which has a protective layer (18) directly connected to a light guide core (16) on its light exit side (30) at least in a visible area (32), into which light (24) from at least one light source (22) can be coupled via the light guide core (16) via at least one coupling-in side (20), and which has a coupling-out structure (28) on its rear side (26) opposite the light exit side (30), which structure is set up to deflect light (24), as a result of which the deflected light (24)

(Continued)

Figure 1:
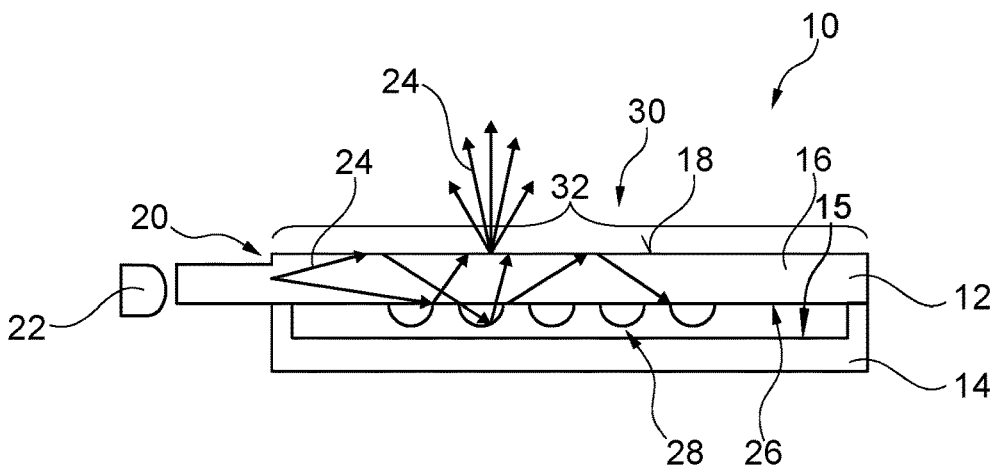

can be coupled into the light guide core (16) via at least one coupling-in side (20). (24) emerges from the light guide (12) into the environment via the light exit side (30), and with a housing (14) which covers the rear side (26) at least in overlap with the entire visible area (32) of the light guide (12) on a side facing away from the light exit side (30) and is connected to the light guide (12) in a dust-proof and contamination-proof manner.

20 Claims, 1 Drawing Sheet

(51) Int. Cl.
    B60K 35/20        (2024.01)
    B60Q 3/64        (2017.01)
(52) U.S. Cl.
    CPC ......... G02B 6/0065 (2013.01); G02B 6/0093 (2013.01)
(58) Field of Classification Search
    USPC .......................................................... 362/92
    See application file for complete search history.

(56) References Cited

U.S. PATENT DOCUMENTS

2020/0033980 A1*  1/2020  Lee ........................ G06F 3/0412
2020/0124886 A1    4/2020  Song

FOREIGN PATENT DOCUMENTS

DE    10 2014 006 490.5 A1    12/2015
DE    10 2015 013 669.0 A1    4/2017
WO         2018114828 A1    6/2018
WO         2019/114981 A1    6/2019

OTHER PUBLICATIONS

International Search Report & Written Opinion, Int'l. Appl'n. No. PCT/EP2022/073270, Jan. 24, 2023.
English Translation of International Search Report & Written Opinion, Int'l. Appl'n. No. PCT/EP2022/073270, Jan. 24, 2023.

\* cited by examiner

LIGHTING DEVICE AND METHOD FOR PRODUCING A LIGHTING DEVICE

TECHNICAL AREA

The invention relates to a lighting device and a method of manufacturing a lighting device.

STATE OF THE ART

A built-in or integrated light guide in a vehicle interior is normally very well protected from direct contact with the observer by means of a fine slot in the interior or by means of a cover lens, a diffuser or a lens array. This protects the light guide from possible scratches, fingerprints, dirt and so on. Such protective measures cost additional installation space and money.

Changes to the surface of the light guide such as scratches, dirt or fingerprints lead to particularly high light losses in the light guide. For a classic rod light guide, which is around 400 millimetres long, such additional light losses are fatal and mean a major deviation from the original homogeneous illumination. These protection requirements can be adopted for flat light guides.

A flat light guide can, for example, be designed as a plate-shaped light guide, which has a greater extension in its length and width, i.e. in the plate plane, than in its thickness direction. The light guide then has a first flat side and a second flat side. The first flat side is the (front) light-emitting side and the second flat side is the rear side of the light guide. The light guide can be a transparent body, for example made of plastic (e.g. epoxy resin, PC, PMMA, ABS, silicone, etc.) or glass. The light guide can also be designed to conduct light by total internal reflection.

The width in the thickness direction does not have to be constant, i.e. the flat sides are parallel The light guide can also have a varying width. By varying the width or wall thickness, it is possible, for example, to achieve a more homogeneous lighting effect. For example, it is conceivable that the width therefore decreases with increasing distance from a light source or light coupling side. The narrow sides of the plate-shaped light guide are generally referred to as edges. The light guide preferably has four edges, which can, for example, serve as light coupling sides or light coupling edges.

The flat light guide can be 3D shaped, in particular curved. However, the light guide can generally have any shape. For example, the light guide can be straight or curved. The light guide can also have a complex geometry.

DESCRIPTION OF THE INVENTION

The task of the present invention is to provide a particularly space-saving lighting device with particularly few individual components.

This problem is solved according to the invention by the object of the independent patent claim. Further possible embodiments of the invention are disclosed in the subclaims, the description and the figures.

The invention relates to a lighting device, in particular for an interior area in motor vehicles. The lighting device is thus set up to emit light. The lighting device comprises a flat light guide which has a protective layer directly connected to a light guide core, in particular directly adjacent to it, on its light emission side at least in a visible area. This protective layer can be molded, glued or painted onto the light guide core. In the lighting device, the protective layer is bonded to the light guide core, making the lighting device particularly compact and therefore particularly space-saving. In particular, the protective layer is at least partially, especially predominantly, transparent. When the lighting device is arranged in an interior of the vehicle, the light emission side in particular faces the vehicle interior. Directed light emission of useful light from the light guide into its surroundings can take place via the light emission side. Light from at least one light source can be fed into the light guide core via any edge or via at least one coupling side. This light can be emitted from the light guide into the environment via the light exit side. The light guide also has a decoupling structure on its rear side opposite the light exit side, which is designed to deflect light. By redirecting the light, the redirected light exits the light guide via the light exit side. The decoupling structure thus enables the light guided in the light guide core to radiate out of the light guide into the environment via the light exit surface. The lighting device also comprises a housing which covers the rear side at least in overlap with the entire visible area of the light guide on a side facing away from the light emission side and is connected to the light guide in a dust and dirt-proof manner. In particular, the housing is directly connected to the light guide. In this way, the housing and the light guide are connected to each other in a dust-proof and dirt-proof manner, whereby in particular a moisture exchange for the removal of condensate from the housing and/or a pressure equalization with an environment of the lighting device is possible. This moisture exchange and/or pressure equalization can take place via a dust-proof opening in the housing and/or an integrated membrane. By covering the rear of the light guide with the housing, at least over the entire visible area of the light guide, the light guide can be protected from soiling on its rear side. This soiling can be, for example, fingerprints, sunscreen smears or dust. As a result, direct coupling of light out of the light guide into the environment due to light reflected from the soiling can be at least essentially avoided.

In a further development of the invention, it is provided that the protective layer provides an outer surface of the lighting device. The protective layer can thus seal off the lighting device from the interior of the vehicle. The protective layer thus provides the light-emitting surface of the light guide. The light-emitting surface is not covered by other components of the lighting device.

This makes the lighting device particularly compact.

The protective layer can have a so-called black panel effect. This means that when the lighting device is deactivated, the respective components behind the protective layer are not visible or only partially visible to an observer when looking at the light-emitting surface from above. The protective layer can have a black optic or a white optic. The transmission of the protective layer with black optics or white optics is approx. 2-30%, in particular 10-20%. The protective layer makes it possible to conceal the components of the lighting device behind the protective layer. The protective layer is at least partially transparent. In particular, the protective layer can have varying degrees of local transparency. The protective layer can be printed with a partial, opaque design print.

In a further embodiment of the invention, it is provided that the light guide is formed as a single piece. This means that the light guide core and the protective layer form a single unit and are therefore not separated from each other by an air gap. In particular, the protective layer is bonded to the light guide core by painting or back-molding. This one-piece design of the light guide allows the light to exit the light guide particularly efficiently via the light exit side, as there are particularly few reflective surfaces on which the light could be reflected back before exiting the light guide. Furthermore, the lighting device is particularly compact due to the one-piece design of the light guide.

In a further embodiment of the invention, it is provided that the protective layer is provided by a film composite and/or by a protective lacquer. As an alternative to providing the protective layer from the film composite, the protective layer can be provided by a single film. Providing the protective layer using the protective varnish makes it particularly easy to apply the protective layer to the light guide core and to bond the protective layer directly to the light guide core. The provision of the protective layer by the film composite enables different functions to be provided by different films in the film composite.

In this context, it may in particular be provided that the film composite comprises a touch-sensitive film. This touch-sensitive foil can, for example, be a capacitive foil which is set up to receive a user input represented by approach or touch by a user. Depending on the user input received, the light emitted by the light guide can be adjusted, in particular by controlling the light source depending on the user input received. The touch-sensitive film thus enables a human-machine interface, which is also referred to as a human-machine interface.

In particular, the touch-sensitive film in the film composite is covered by a protective film towards the light emission side. In other words, the touch-sensitive film in the light guide is covered on a first side by the protective film, in particular towards the outside, and on a second side opposite the first side is covered by the optical fiber core. As a result, the touch-sensitive film can be particularly well protected against damage. Furthermore, the protective film can be designed to protect the light guide core from damage. The protective film thus enables a particularly robust and durable design of the light guide.

In a further embodiment of the invention, it is provided that the film composite is back-injected with the light guide core. To provide the light guide, the film composite can first be formed into a predetermined 3D geometry by thermal deformation. The film composite is then inserted into an injection molding tool and back-injected with the light guide core. This allows the light guide to be formed in one piece particularly reliably. By injection-molding the light guide core to the film composite, the film composite and the light guide core can be arranged particularly close to each other, especially without an air gap.

In a further embodiment of the invention, it is envisaged that the decoupling structure is provided by a raised and/or recessed microstructure on the rear surface of the light guide. The decoupling structure can be produced directly in a process with the light guide core. For this purpose, a negative of the decoupling structure can already be located in a rear half of an injection molding tool and the decoupling structure on the rear of the light guide core can therefore be formed directly in the injection molding process. The direction of the light emerging from the light guide via the light exit side can be influenced by the geometric design of the decoupling structure as the elevations and/or the depressions. For example, a symbol or a luminous partial surface or lettering or a design pattern can be formed as a luminous surface by partial, geometric arrangement of the decoupling structure. In particular, the decoupling structure can be formed integrally with the light guide core due to the elevations or depressions on the surface of the light guide, which means that the light guide can be made particularly compact.

In particular, the decoupling structure is molded onto the back and/or embossed onto the back. By injection molding the decoupling structure onto the rear side, the decoupling structure can be provided by protrusions or depressions on the surface of the light guide. When the decoupling structure is embossed, the decoupling structure is provided by protrusions and/or depressions in the surface of the light guide. The output coupling structure can thus be produced by injection molding and/or by embossing. Raised and/or recessed structures can be realized in both processes. The decoupling structure is formed on the optical fiber core. The injection molding and/or embossing of the decoupling structure on the rear side enables a particularly simple and integral provision of the decoupling structure with the light guide core.

In a further embodiment of the invention, it is provided that the housing is laser-welded and/or clipped and/or bonded and/or ultrasonically welded in particular to the light guide. By laser welding the housing to the light guide, the housing can be held particularly securely to the light guide. In addition, the housing can be connected to the light guide in a particularly dust-proof manner, which minimizes the risk of contamination penetrating between the housing and the light guide, in particular to the rear of the light guide.

In a further embodiment of the invention, it is provided that the housing has an inner side facing the viewing area, which is partially absorbent or diffusely reflective or scattering or weakly reflective. In particular, the inside of the housing in the viewing area can be non-reflective or not highly reflective. The reflective properties of the inner side of the housing facing the viewing area can be adjusted in particular by painting and/or an applied pattern and/or a laminated material. Due to this design of the inside of the housing, it can be avoided that light is coupled out of the light guide in the direction of the housing due to soiling on the light exit side of the light guide, reflected back from the housing into the light guide and coupled out of the light guide via the light exit side. Unwanted directional scattering of light emitted from the light guide via the housing, via the light guide and then via the viewing area can thus be at least substantially avoided. As a result, the light emitted from the light guide directly via the viewing area can be specified particularly precisely by the decoupling structure.

The invention also relates to a method for manufacturing a lighting device as already described in connection with the lighting device according to the invention. In the method, it is provided that the light guide is produced in one piece from the light guide core and the protective layer. In this case, the protective layer is applied to the light-emitting side of the light guide at least in the visible area. Furthermore, it is provided in the method that the housing is arranged to cover the rear side of the light guide on the side facing away from the light emission side, at least overlapping the entire visible area of the light guide. Advantages and advantageous embodiments of the lighting device according to the invention are to be regarded as advantages and advantageous embodiments of the method according to the invention and vice versa.

Further advantages, features and details of the invention can be seen from the following description of possible embodiments and from the drawing. The features and combinations of features mentioned above in the description as well as the features and combinations of features shown below in the figure description and/or in the figures alone can be used not only in the combination indicated in each case, but also in other combinations or on their own, without departing from the scope of the invention.

SHORT FIGURE DESCRIPTION

Figure 2:
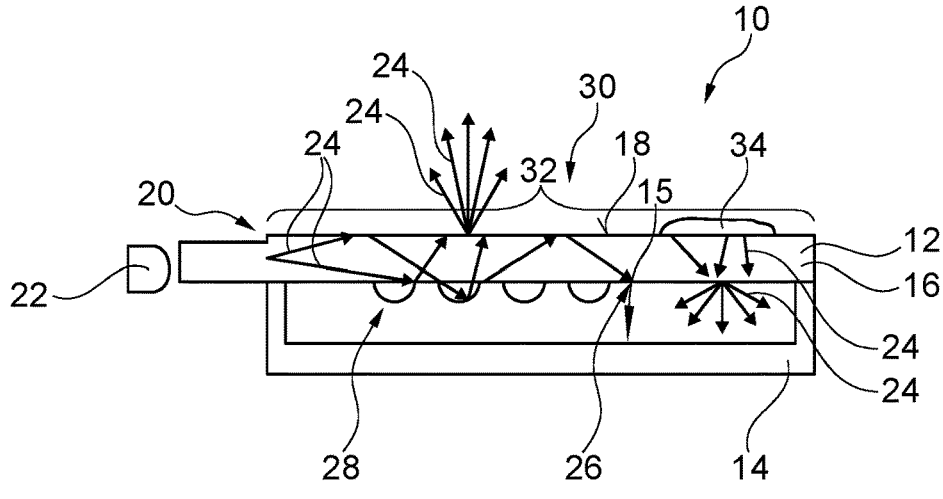
Figure 3:
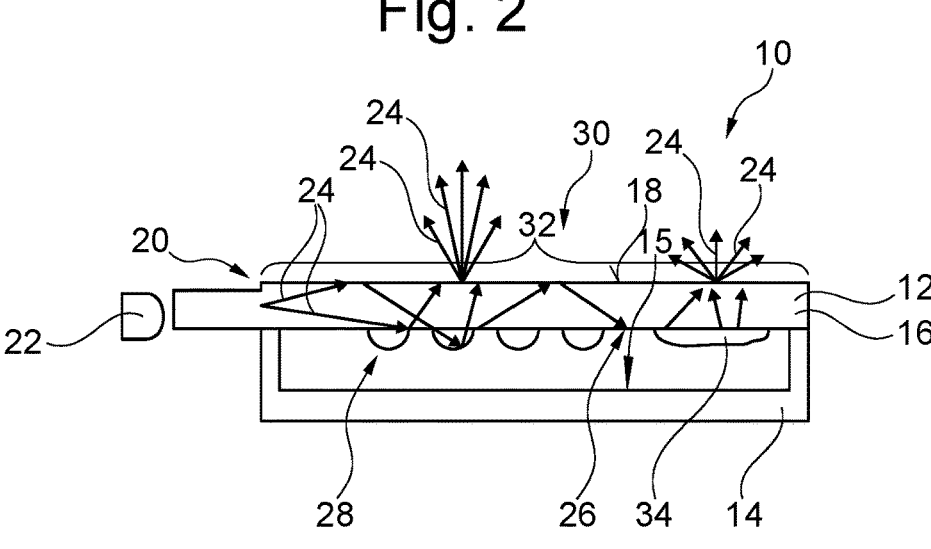

The Drawing Shows in:

FIG. 1 a schematic sectional view of an illumination device with a one-piece lightguide, into which light can be coupled from a light source via a coupling-in side, whereby the light can be deflected by a coupling-out structure of the light guide, as a result of which the deflected light can emerge from the light guide via a viewing area on a light exit side of the light guide, whereby arear side of the light guide opposite the light exit side is protected from dust and soiling from the outside by a housing, at least in the viewing area;

FIG. 2 aschematic sectional view of the lighting device as shown in FIG. 1, with soiling arranged in the viewing area on the light exit side of the light guide; and FIG. 3 aschematic sectional view of the lighting device as shown in FIG. 1, with soiling arranged on the rear of the light guide.

Elements with the same function are assigned the same reference symbols in the figures.

FIGS. 1 to 3 each show a lighting device 10 which is designed in particular to be used in a vehicle, especially a motor vehicle, in an interior area. The lighting device 10 comprises a one-piece flat light guide 12 and a housing 14, which covers the light guide 12 at least in some areas. The light guide 12 comprises a light guide core 16 and a protective layer 18 arranged directly on the light guide core 16. In the present case, the protective layer 18 is a protective coating and/or a film composite and/or a single-layer film. In particular, the film composite can comprise a touch-sensitive film which is set up to receive a user input represented by a touch from a person. Alternatively or additionally, the film composite may comprise a protective film which is designed to protect the light guide core 16 and/or the touch-sensitive film from damage. For this purpose, the protective film can be arranged in the film composite on a side of the touch-sensitive film facing away from the optical fiber core 16. In particular, the film composite can be provided from several layered films, one of which can be designed as a protective film. The touch-sensitive film can comprise at least one transparent or partially transparent conductor track for electrical functions, in particular touch sensitivity.

In order to be able to form the flat light guide 12 in one piece, the protective coating can be applied as a protective layer 18 by spray coating to the light guide core 16 for providing the light exit side 30 of the light guide 12. If the film composite or the single-layer film is provided as a protective layer 18, the light guide core 16 can be sprayed onto the film composite or the single-layer film, in particular as part of an injection molding process. In this way, loose elements of the light guide 12 can be avoided.

The planar light guide 12 has at least one coupling side 20, via which light 24 from at least one light source 22 can be coupled into the light guide 12.

In particular, the light 24 is fed from the light source 22 into the light guide core 16 of the light guide 12. The injected light 24 is propagated within the optical fiber core 16. For this purpose, the light 24 can be guided within the light guide core 16 by total internal reflection. To decouple the light 24 from the optical fiber core 16, the light 24 must be redirected. In order to be able to decouple light 24 from the light guide core 16 and furthermore from the light guide 12, the light guide 12 has a decoupling structure 28 on its rear side 26. The decoupling structure 28 on the rear side 26 of the light guide 12 is kept free of the protective coating. In the present case, the decoupling structure 28 is characterized by protrusions are provided on the surface of the light guide 12 at the rear side 26. For arranging the decoupling structure 28 on the rear side 26 of the light guide 12, the protrusions can be formed on the rear side 26 by an injection molding process or the protrusions can be formed on the rear side 26 by an embossing process when the light guide core 16 is provided. In this way, the projections and the optical fiber core 16 are formed from the same material. Alternatively or in addition to providing the decoupling structure 28 by projections, the decoupling structure 28 can be provided by indentations on the rear side 26 of the light guide 12. In particular, these depressions can be provided by embossing the light guide core 16 on the rear side 26. In the present case, the rear side 26 of the light guide 12 is provided by the light guide core 16.

As a result of the deflection of the light 24 in the light guide core 16 via the decoupling structure 28, the light 24 can emerge from the light guide 12 via a light exit side 30 of the planar light guide 12, in particular in a viewing area 32. At least over the entire viewing area 32, the flat light guide 12 is covered outwardly at its rear side 26 by the housing 14, in particular in a direction facing away from the light exit side 30 starting from the rear side 26. A function of the housing 14 is explained below in particular in connection with FIGS. 2 and 3, in which soiling 34 is arranged on respective surfaces of the light guide 12.

FIG. 2 shows how the contamination 34 is arranged on the light exit side 30 of the flat light guide 12. In this case, the contamination 34 is a fingerprint. The soiling 34 on the light exit side 30 of the light guide 12 causes a deflection of the light 24 and consequently an exit of the light 24 at the rear side 26 of the light guide 12. Due to a not highly reflective, in particular not specularly reflective design of the inside of the housing 15 in the viewing area 32, the light 24 exiting from the light guide 12 at the rear side 26 is partially absorbed and scatteringly reflected by the inside of the housing 15 in the viewing area 32.

As a result, the light 24 emerging from the light guide 12 at the rear side 26 after its partial absorption and scattering on the inside of the housing 15 cannot be clearly perceived by an observer viewing the light guide 12 from the light exit side 30 and, in particular, cannot be assigned to the soiling 34. The inside of the housing 15 thus makes it possible for scattered light due to soiling 34 on the light-emitting side 30 of the light guide 12 not to be perceived as brightly illuminated areas.

FIG. 3 shows soiling 34 on the rear side 26 of the flat light guide 12. In the present case, the soiling 34 is a fingerprint. The soiling 34 on the rear side 26 of the light guide 12 can cause a deflection of the light 24 in the light guide core 16, whereby scattered light on the light exit side 30 caused by the soiling 34 could escape from the light guide 12 and, in particular, the soiling 34 is thus recognizable as a bright area. The housing 14 is designed to protect the rear side 26 of the light guide 12 from soiling 34 in that the housing 14 encloses the rear side 26 in a dust-proof manner, at least in overlap with the viewing area 32, in order to prevent soiling 34 from accumulating on the rear side 26 of the light guide 12. For this purpose, the housing 14 can be laser-welded or otherwise connected to the light guide 12.

Due to the non-highly reflective, in particular non-specularly reflective design of the inner side 15 of the housing in the viewing area 32, the light 24 emerging from the light guide 12 at the rear side 26 is partially absorbed and scattered by the inner side 15 of the housing in the viewing area 32. As a result, the light 24 emerging from the light guide 12 at the rear side 26 cannot be clearly perceived by an observer viewing the light guide 12 from the light exit side 30 after its partial absorption and scattering on the inside of the housing 15 and, in particular, cannot be assigned to the soiling 34. The inside of the housing 15 thus makes it possible for scattered light due to soiling 34 on the light-emitting side 30 of the light guide 12 not to be perceived as brightly illuminated areas.

Due to its particularly compact design, the lighting device 10 described above makes it possible to save on vehicle installation space. Furthermore, the lighting device 10 enables costs to be saved compared to conventional lighting devices, as particularly few components are required for the lighting device 10 and, in particular, a cover lens can be dispensed with.

The lighting device 10 comprises a directly accessible flat light guide 12. In the lighting device 10, it is intended that the rear side 26 of the light guide 12 should be protected. The decoupling structure 28 on the rear side 26 of the light guide 12 is designed such that it decouples the light 24 from the light guide 12 directly in the direction of a viewer. The rear side 26 of the light guide 12 can be protected from dust and fingerprints as soiling 34 by the housing 14.

Fingerprints or dust on the rear side 26 of the flat light guide 12 scatter light 24 incident on the fingerprint or on the dust in the direction of the light-emitting side 30 of the light guide 12. This makes a luminous fingerprint or luminous dust visible to an observer. In order to avoid the accumulation of dust and fingerprints on the rear side 26 of the light guide 12, the flat light guide 12 and the housing 14 are welded and/or glued together in particular.

The front of the flat light guide 12 must be protected from scratches. The protective coating can be provided to protect the light-emitting side 30 of the light guide 12 from scratches. In order to avoid changing the optical properties of the decoupling structure 28, the rear side 26 of the light guide 12 is kept free of paint.

Scratches on the light-emitting side 30 of the light guide 12 can make polished, high-quality surfaces appear inferior and cause significant light losses in the light guide 12. In the present case, only the light-emitting side 30 of the light guide 12 is painted. For this purpose, the protective coating can be applied to the light guide core 16 after a welding process of welding the housing 14 to the light guide 12. By means of the protective coating 18, the light guide 12 can be protected from scratches on its light-emitting side 30 and, if necessary, also on its light guide edges.

Overall, the invention shows how a lighting module can be provided with the flat light guide 12 and without a cover lens.

REFERENCE LIST

10 Lighting device
   12—surface light guide
14 Housing
15 Inside of housing
16 Fiber optic core
18 Protective layer
20 Coupling side
22 Light source
24 Light
26 Back 28 Decoupling structure
30 Light emission side
32 Visibility range
34 Pollution

The invention claimed is:

1. A lighting device, comprising:
   a flat light guide,
      which at its light emission side at least in one viewing area has a protective layer, applied to and forming an outer surface of the light emission side, directly connected to an optical fiber core,
      in which the optical fiber core is connected via at least one coupling side, light can be coupled in from at least one light source, and
      which, on a side opposite the light emission side, has a rear side with a decoupling structure, wherein the decoupling structure is formed by a molded or embossed microstructure on the rear surface of the optical core and is arranged to deflect light, as a result of which the deflected light emerges from the light guide into the environment via the light exit side, and
      a housing, bonded, welded, or otherwise permanently connected to the rear side of the light guide on a side facing away from the light emission side, so as to cover at least the entire visible area of the rear side and seal the rear side in a dust-proof and dirt-proof manner.

2. The lighting device according to claim 1, wherein the protective layer provides an outer surface of the lighting device.

3. The lighting device according to claim 2, wherein the protective layer conceals underlying structures from view when the light source is off.

4. The lighting device according to claim 2, wherein the protective layer has a light transmission between 2% and 30%.

5. The lighting device according to claim 1, wherein the light guide is formed in one piece.

6. The lighting device according to claim 1, wherein the protective layer is provided by at least one of: a film, a film composite and a protective coating.

7. The lighting device according to claim 6, wherein the film or the film composite comprises a touch-sensitive layer that is covered by a protective film, in particular on a side facing the light emission side.

8. The lighting device according to claim 7, wherein the touch-sensitive layer is configured to control a lighting function in response to user input.

9. The lighting device according to claim 6, wherein the film or the film composite is back-molded with the light guide core.

10. The lighting device according to claim 1, wherein the decoupling structure is provided by a raised or recessed microstructure of a rear surface of the light guide, and the decoupling structure is at least one of molded onto the rear surface and introduced by embossing on the rear surface.

11. The lighting device according to claim 1, wherein the housing is at least one of laser-welded, clipped, bonded and ultrasonically welded to the light guide.

12. The lighting device according to claim 1, wherein the housing has an inner side facing the viewing area, the inner side being partially absorbing, diffusely reflecting, scattering, or weakly reflecting.

13. The lighting device according to claim 1, wherein the decoupling structure is configured to form a symbol, lettering, or pattern visible through the light emission side.

14. The lighting device according to claim 1, wherein the housing comprises a membrane or opening configured for pressure equalization or moisture exchange with the environment.

15. A method for producing a lighting device, comprising:

forming a light guide in one piece from a light guide core and a protective layer;

arranging the protective layer on a light exit side of the light guide, at least in a viewing area, bonding, welding or otherwise connecting a housing to a rear side of the light guide on a side facing away from a light emission side, so as to cover at least an entire viewing area of the rear side and seal the rear side in a dust-proof and dirt-proof manner, and forming a decoupling structure by a molded or embossed microstructure on the rear surface of the optical core and arranging the decoupling structure so as to deflect light, as a result of which the deflected light emerges from the light guide into the environment via the light exit side.

16. The method of claim 15, wherein the decoupling structure is formed to emit light in the shape of a symbol, lettering, or pattern.

17. The method of claim 15, further comprising forming a membrane or opening in the housing to allow for pressure equalization or moisture exchange.

18. The method of claim 15, wherein the protective layer comprises a material having a transmission between 2% and 30% to produce a black panel effect when the light source is off.

19. The method of claim 15, wherein the protective layer is applied as a transparent protective coating directly to the light guide core.

20. A method for producing a lighting device, comprising:

forming a film composite comprising a touch-sensitive layer and a protective film;

back-molding the film composite with a light guide core to form a one-piece light guide;

arranging the protective film on a light exit side of the one-piece light guide such that the touch-sensitive layer is positioned between the core and the protective film;

wherein the one-piece light guide is flat is configured such that its light emission side at least in one viewing area has a protective layer, applied to and forming an outer surface of the light emission side, directly connected to an optical fiber core;

wherein the optical fiber core is connected via at least one coupling side, light can be coupled in from at least one light source;

wherein, on a side opposite the light emission side, has a rear side with a decoupling structure, wherein the decoupling structure is formed by a molded or embossed microstructure on the rear surface of the optical core and is arranged to deflect light, as a result of which the deflected light emerges from the light guide into the environment via the light exit side, and wherein a housing, bonded, welded, or otherwise permanently connected to the rear side of the light guide on a side facing away from the light emission side, so as to cover at least the entire visible area 32 of the rear side and seal the rear side in a dust-proof and dirt-proof manner.

* * * * *